(12) United States Patent
Huang

(10) Patent No.: US 7,958,277 B2
(45) Date of Patent: Jun. 7, 2011

(54) VIDEO PLAYER AND ELECTRONIC SYSTEM UTILIZING THE SAME

(75) Inventor: Wei-Chih Huang, Taipei (TW)

(73) Assignee: Princeton Technology Corporation, Taipei (TW)

( * ) Notice: Subject to any disclaimer, the term of this patent is extended or adjusted under 35 U.S.C. 154(b) by 1444 days.

(21) Appl. No.: 11/408,952

(22) Filed: Apr. 24, 2006

(65) Prior Publication Data

US 2006/0282555 A1 Dec. 14, 2006

(30) Foreign Application Priority Data

Jun. 14, 2005 (TW) ................................ 94119624 A

(51) Int. Cl.
*G06F 13/10* (2006.01)
(52) U.S. Cl. .......................................... 710/15; 439/188
(58) Field of Classification Search ........................ None
See application file for complete search history.

(56) References Cited

U.S. PATENT DOCUMENTS

| | | | | |
|---|---|---|---|---|
| 5,059,948 A * | 10/1991 | Desmeules | ................ | 340/568.4 |
| 5,091,774 A * | 2/1992 | Lovely et al. | ................ | 348/502 |
| 5,305,105 A * | 4/1994 | Heo | ................ | 348/485 |
| 5,505,203 A * | 4/1996 | Deitrich et al. | ................ | 600/437 |
| 5,535,371 A * | 7/1996 | Stewart et al. | ................ | 703/25 |
| 5,741,151 A * | 4/1998 | Youngers | ................ | 439/489 |
| 6,178,514 B1 * | 1/2001 | Wood | ................ | 713/300 |
| 6,346,927 B1 * | 2/2002 | Tran et al. | ................ | 345/1.1 |
| 6,896,541 B2 * | 5/2005 | Benson | ................ | 439/489 |
| 7,075,586 B2 * | 7/2006 | McIntyre | ................ | 348/558 |
| 7,268,561 B2 * | 9/2007 | Zhu | ................ | 324/538 |
| 7,296,107 B2 * | 11/2007 | Lunsford et al. | ................ | 710/304 |
| 7,334,054 B2 * | 2/2008 | Anderson | ................ | 710/15 |
| 7,519,190 B2 * | 4/2009 | Lin et al. | ................ | 381/123 |
| 7,840,714 B2 * | 11/2010 | Downing et al. | ................ | 710/2 |
| 2002/0178307 A1 * | 11/2002 | Pua et al. | ................ | 710/62 |
| 2005/0177653 A1 * | 8/2005 | Chiu | ................ | 710/15 |
| 2006/0195627 A1 * | 8/2006 | Cole et al. | ................ | 710/15 |
| 2007/0083888 A1 * | 4/2007 | Liebhold | ................ | 725/37 |

FOREIGN PATENT DOCUMENTS

JP 10126806 A * 5/1998

* cited by examiner

*Primary Examiner* — Cheng-Yuan Tseng
(74) *Attorney, Agent, or Firm* — Muncy, Geissler, Olds & Lowe, PLLC

(57) ABSTRACT

A video player transmits a first video signal to a display device through a first connection group. At least one first output terminal outputs the first video signal. At least one second output terminal outputs the first video signal. A controller determines whether the first output terminal is coupled to the display device through the first connection group and determines whether the second output terminal is coupled to the display device through the first connection group. The controller only provides the first video signal to the first output terminal when the first output terminal is coupled to the display device through the first connection group. The controller only provides the first video signal to the second output terminal when the second output terminal is coupled to the display device through the first connection group.

16 Claims, 7 Drawing Sheets

| Point | Peak voltage | Main output terminal |
|---|---|---|
| P1 | ≈ 1V | Output terminals 211, 212, or 213 or defining by an user |
| P2 | ≈ 1V | |
| P3 | ≈ 1V | |
| P4 | ≈ 1V | |
| P5 | ≈ 1V | |
| P6 | ≈ 1V | |

FIG. 5a

| Point | Peak voltage | Main output terminal |
|---|---|---|
| P1 | ≈ 2V | Output terminals 211 or 212 or defining by an user |
| P2 | ≈ 2V | |
| P3 | ≈ 2V | |
| P4 | ≈ 1V | |
| P5 | ≈ 1V | |
| P6 | ≈ 1V | |

FIG. 5b

| Point | Peak voltage | Main output terminal |
|---|---|---|
| P1 | ≈ 2V | Output terminal 211 |
| P2 | ≈ 2V | |
| P3 | ≈ 2V | |
| P4 | ≈ 2V | |
| P5 | ≈ 2V | |
| P6 | ≈ 1V | |

FIG. 5c

| Point | Peak voltage | Main output terminal |
|---|---|---|
| P1 | ≈ 1V | Output terminals 211 or 213 or defining by an user |
| P2 | ≈ 1V | |
| P3 | ≈ 1V | |
| P4 | ≈ 2V | |
| P5 | ≈ 2V | |
| P6 | ≈ 1V | |

FIG. 5d

| Point | Peak voltage | Main output terminal |
|---|---|---|
| P1 | ≈ 1V | Output terminal 213 |
| P2 | ≈ 1V | |
| P3 | ≈ 1V | |
| P4 | ≈ 2V | |
| P5 | ≈ 2V | |
| P6 | ≈ 2V | |

FIG. 5e

| Point | Peak voltage | Main output terminal |
|---|---|---|
| P1 | ≈ 2V | None |
| P2 | ≈ 2V | |
| P3 | ≈ 2V | |
| P4 | ≈ 2V | |
| P5 | ≈ 2V | |
| P6 | ≈ 2V | |

FIG. 5f under a title US 7,958,277 B2

VIDEO PLAYER AND ELECTRONIC SYSTEM UTILIZING THE SAME

BACKGROUND OF THE INVENTION

1. Field of the Invention

The present invention relates to a player, and in particular relates to a video player.

2. Description of the Related Art

FIG. 1 is a schematic connection diagram of a television and a digital video disc (DVD) player. Television 11 comprises a composite video terminal (composite video) 111, an S-video terminal (S-video) 112, and a component video terminal (component video) 113 for receiving a high resolution video signal. DVD player 12 comprises a composite video terminal 121, S-video terminal 122, and a component video terminal 123. The component video terminals 113 and 123 use for transmitting the high resolution video signal. DVD player 12 provides a video signal to television 11 through connection lines 131~133.

Connection line 131 is connected between composite video terminals 111 and 121. Connection line 132 is connected between S-video terminals 112 and 122. Connection line 133 is connected between component video terminals 113 and 123.

An original setting of DVD player 12 is defined in composite video terminal 121 and S-video terminal 122. When composite video terminal 111 is coupled to composite video terminal 121 through connection line 131 or when S-video terminal 112 is coupled to S-video terminal 122 through connection line 132, television 11 can receive the video signal provided from DVD player 12. Because of the original setting of DVD player 12 is defined in composite video terminal 121 and S-video terminal 122 but not component video terminal 123. So that, if a user desires to view a high resolution video, the original setting must be changed from composite video terminal 111 and S-video terminal 121 into component video terminal 123.

A conventional setting method first utilizes connection line 131 to connect composite video terminals 111 and 121 or utilizes connection line 132 to connect S-video terminals 112 and 122. Next, DVD player 12 provides a video signal to television 11 for displaying a setting image. A setting of the setting image is changed from composite video terminal 121 or S-video terminal 122 into component video terminal 123. Finally, television 11 can receive a high resolution video signal output from DVD player 12 when component video terminal 113 is coupled to component video terminal 123 through component video terminals 113.

To change the setting of the setting image, the user utilized connection lines 131 or 132 to connect DVD player 12 and television 11 and then utilizes connection line 133 to connect DVD player 12 and television 11, such that the user must have two connection lines. If the user only has connection line 133, the setting of setting image is not changed.

BRIEF SUMMARY OF THE INVENTION

Video players are provided. An exemplary embodiment of a video player, which transmits a first video signal to a display device through a first connection group, comprises at least one first output terminal, at least one second output terminal, and a controller. The first output terminal outputs the first video signal. The second output terminal outputs the first video signal. The controller determines whether the first output terminal is coupled to the display device through the first connection group and determines whether the second output terminal is coupled to the display device through the first connection group. The controller only provides the first video signal to the first output terminal when the first output terminal is coupled to the display device through the first connection group. The controller only provides the first video signal to the second output terminal when the second output terminal is coupled to the display device through the first connection group.

Electronic systems are also provided. An exemplary embodiment of an electronic system comprises a display device, a first connection group, and a video player. The display device displays an image. The video player comprises at least one first output terminal, at least one second output terminal, and a controller. The first output terminal outputs the first video signal. The second output terminal outputs the first video signal. The controller determines whether the first output terminal is coupled to the display device through the first connection group and determines whether the second output terminal is coupled to the display device through the first connection group. The controller only provides the first video signal to the first output terminal when the first output terminal is coupled to the display device through the first connection group. The controller only provides the first video signal to the second output terminal when the second output terminal is coupled to the display device through the first connection group.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 5a~5f show the determining results of the processor.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
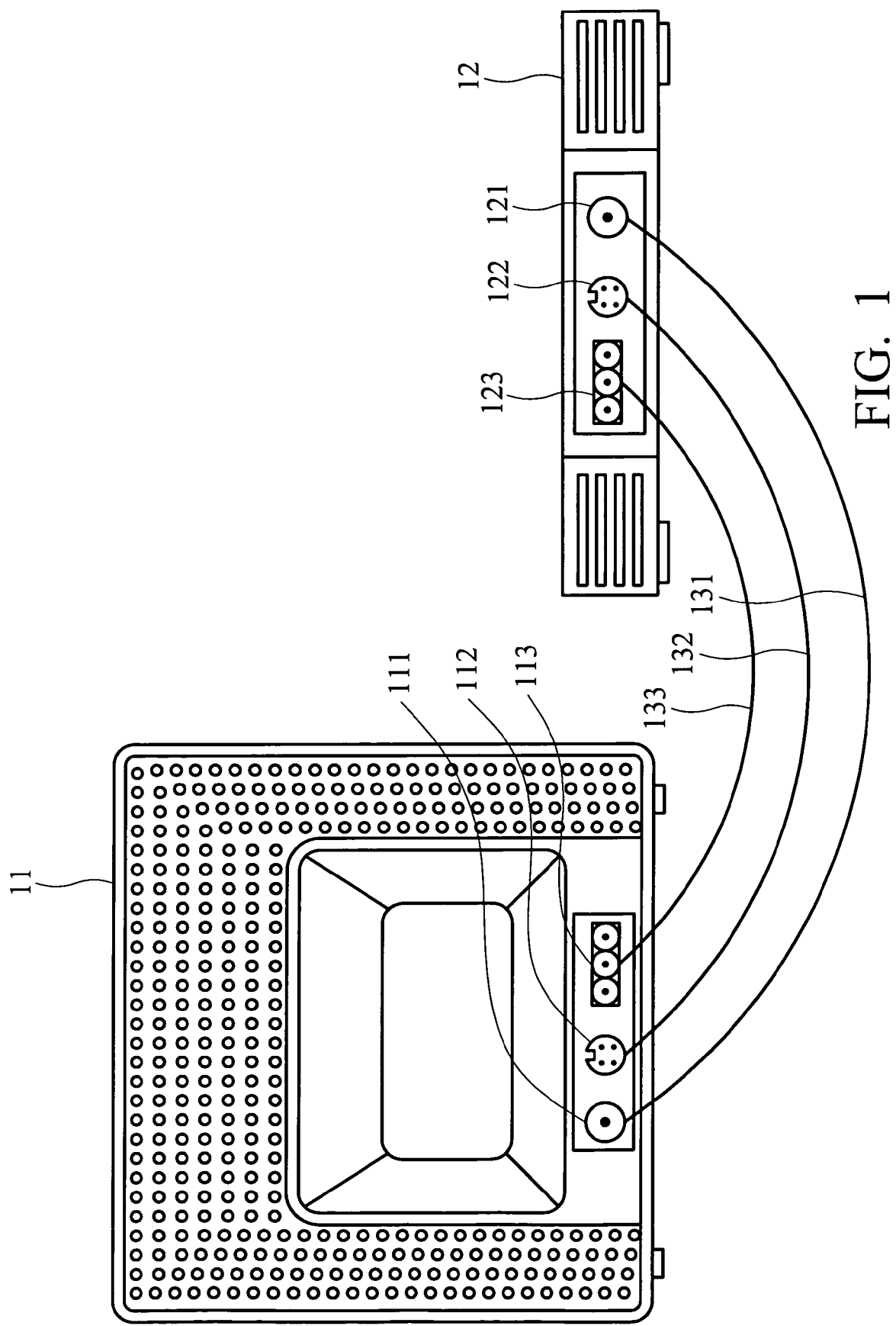
FIG. 1 is a schematic connection diagram of a television and a digital video disc (DVD) player.
Figure 2:
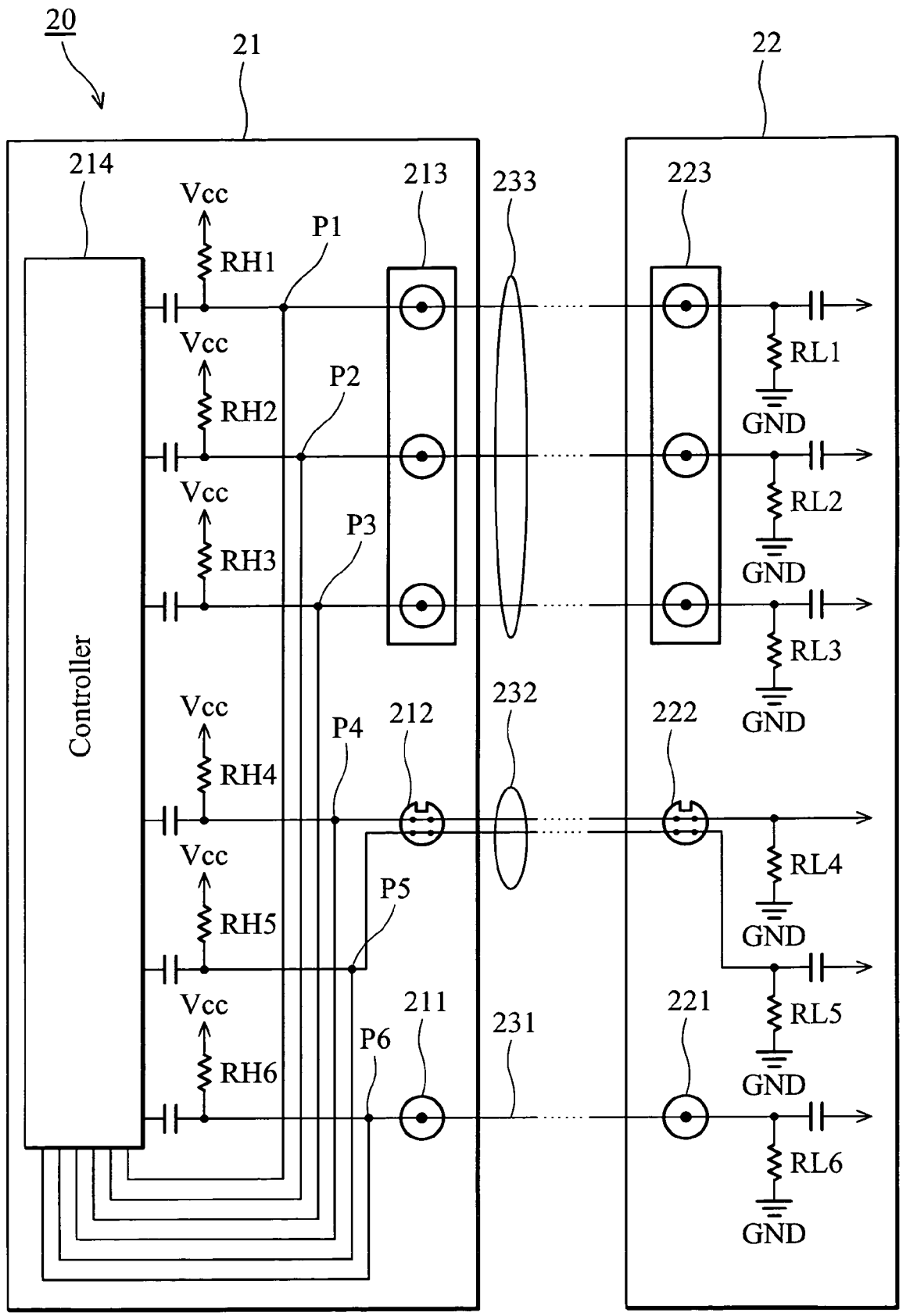
FIG. 2 is a schematic diagram of an exemplary embodiment of an electronic system.

FIG. 2 is a schematic diagram of an exemplary embodiment of an electronic system. The electronic system 20 comprises a video player 21, a display device 22, and connection groups 231~233.

Video player 21 provides a video signal to display device 22 through connection groups 231, 232, or 233. Video player 21 comprises output terminals 211~213 and controller 214. In this embodiment, output terminal 211 is a composite video terminal, output terminal 212 is an S-video terminal, and output terminal 213 is a component video terminal for outputting a high resolution video signal.

Controller 214 determines whether video player 21 is coupled to display device 22 through connection groups 231, 232, or 233. Controller 214 only provides video signals to output terminal 211 when connection group 231 is coupled between output terminal 211 of video player 21 and input terminal 221 of display device 22. Controller 214 only provides the video signals to output terminal 212 when connection group 232 is coupled between output terminal 212 of video player 21 and input terminal 222 of display device 22. Controller 214 only provides the video signals to output terminal 213 when connection group 233 is coupled between output terminal 213 of video player 21 and input terminal 223 of display device 22.

In an embodiment, the display device 22 can be a television, such as a high definition television (HDTV). Display device 22 comprises input terminals 221~223 for receiving video signals. In this embodiment, input terminal 221 is a composite video terminal, input terminal 222 is an S-video terminal, and input terminal 223 is a component video terminal for receiving high resolution video signal that corresponded to the high resolution image. In this embodiment, the number of input terminals is three and the number of output terminals is three, but the disclosure is not limited thereto.

The video signal output from output terminal 211 is a mixed video signal comprising a video brightness element Y and a video shade element C, such that the connection group 231 comprises only one connection line for transmitting video signal. The video signals output from output terminal 212 comprises a video brightness element Y and a video shade element C, such that the connection group 232 comprises two connection lines for transmitting video signals. The video signals output from output terminal 213 comprises a video brightness element Y, aberration elements Pb and Pr, such that the connection group 233 comprises three connection lines for transmitting video signals.

Video player 21 comprises pull high resistors RH1~RH6 coupled between high voltage Vcc and output terminals 213~211, respectively. Display device 22 comprises pull low resistors RL1~RL6 coupled between low voltage GND and input terminals 223~221, respectively.

When one of the input terminals 221~223 is coupled to one of the output terminals 211~213 through one of the connection groups 231~233, the corresponding pull high resistor RH1~RH6 and the corresponding pull low resistor RL1~RL6 are connected to act as a voltage divider. So that, controller 214 can determine whether the output terminals 211~213 of the video player 21 are coupled to the input terminals 221~223 of the display device 22 through connection groups 231~233 according to voltages of points P1~P6 respectively.

Figure 3:
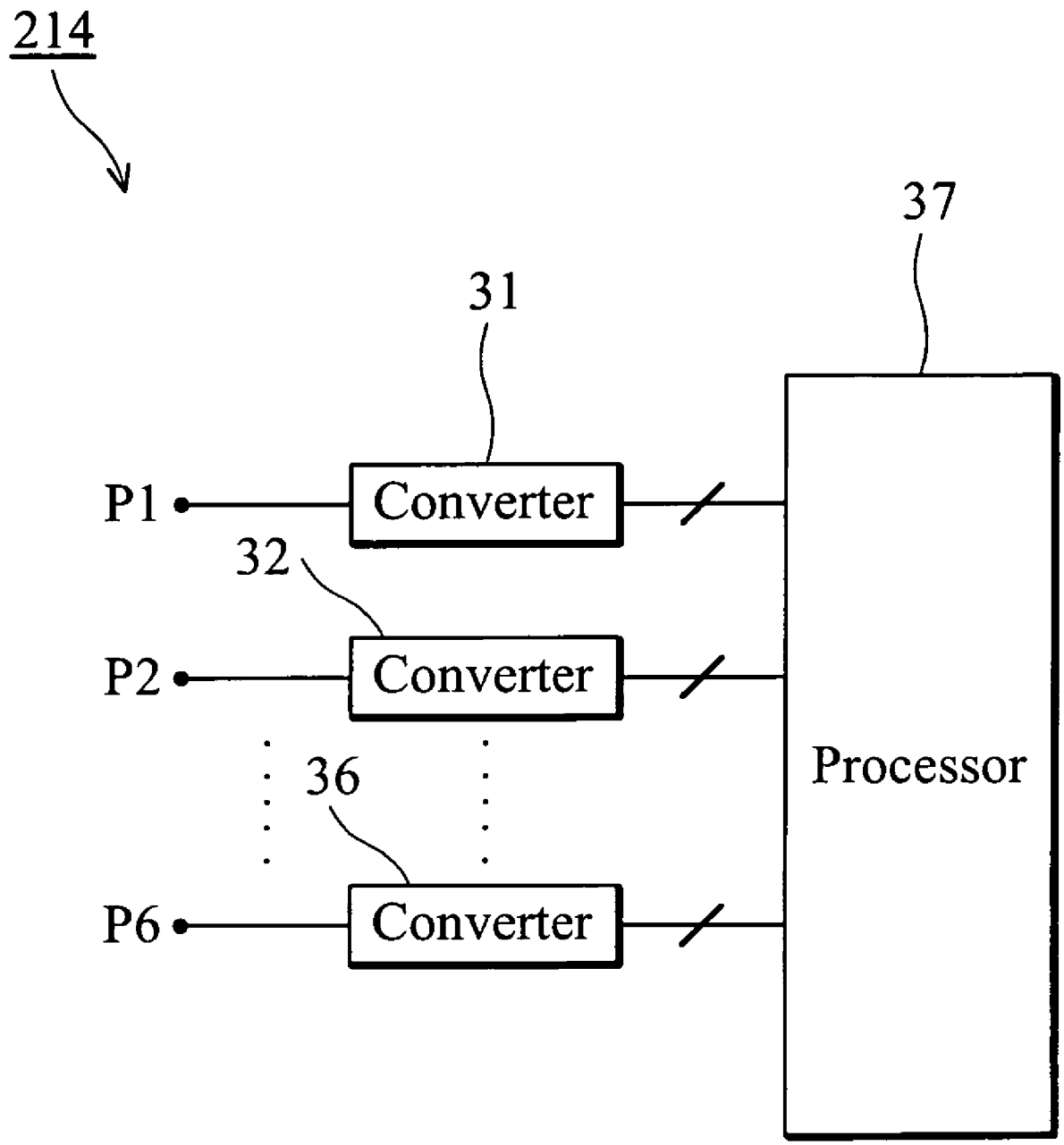
FIG. 3 is a schematic diagram of an exemplary embodiment of the controller.

FIG. 3 is a schematic diagram of an exemplary embodiment of the controller. Controller 214 comprises converters 31~36 and a processor 37. In this embodiment, converters 31~36 are analog digital converters (ADCs) for transforming voltages of points P1~P6 into digital values. Processor 37 determines whether the output terminals 211~213 of the video player 21 are coupled to the input terminals 221~223 of the display device 22 according to the digital values respectively.

Figure 4:
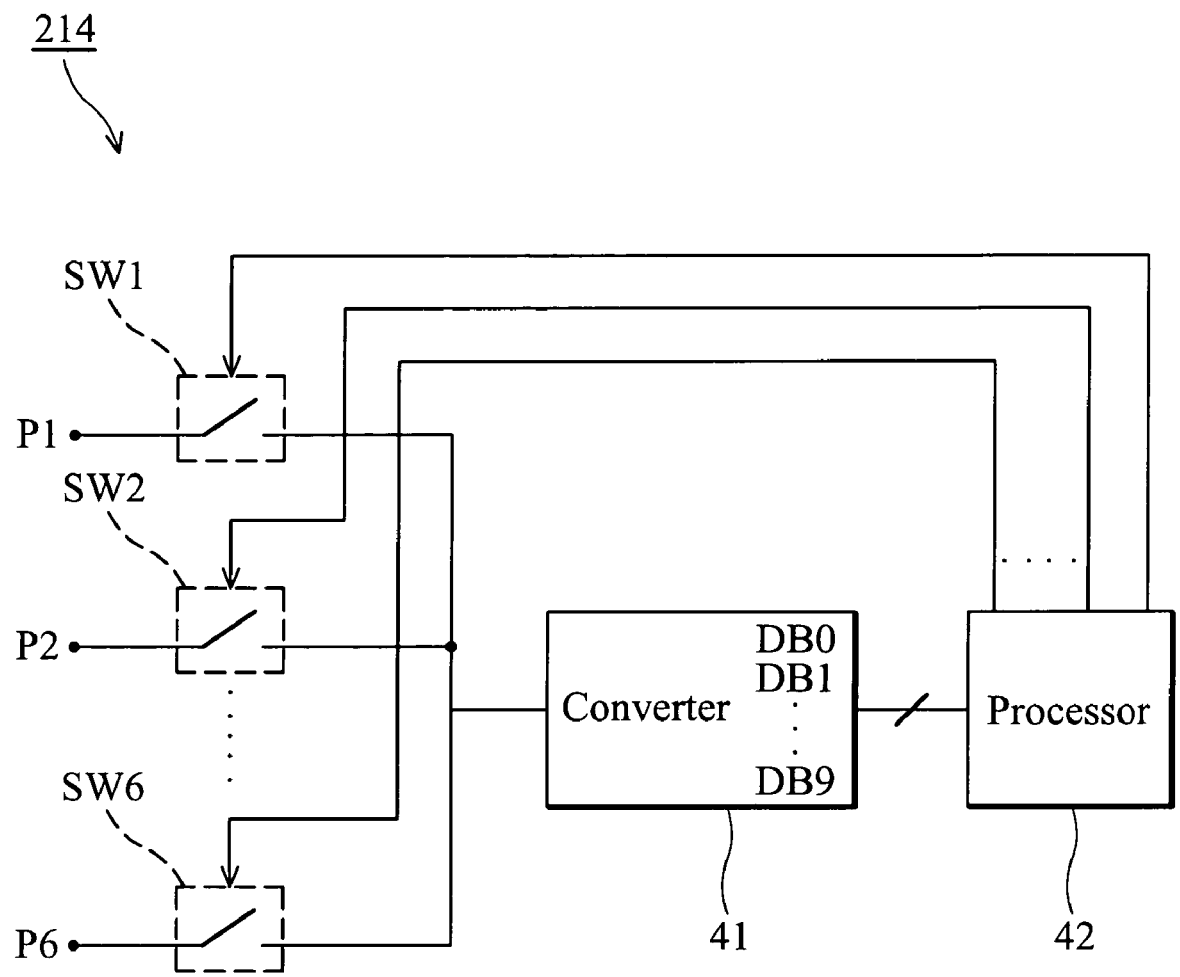
FIG. 4 is a schematic diagram of an exemplary embodiment of the controller.

FIG. 4 is a schematic diagram of an exemplary embodiment of the controller. Controller 214 comprises switches SW1~SW6, converter 41, and processor 42. Switches SW1~SW6 are controlled by processor 42 for providing voltages of points P1~P6 to converter 41 sequentially. Converter 41 is an ADC for transforming voltages of P1~P6 into digital values and provides the digital values to processor 42. Processor 42 determines whether video player 21 is coupled to display device 22 according to the digital values.

As shown in FIGS. 2 and 4, if output terminals 211~213 are not coupled to input terminals 221~223 through connection groups 231~233, peak voltages of points P1~P6 is approximately 2V. Assuming that resistances of pull high resistors RH1~RH6 and pull low resistors RL1~RL6 are the same, converter 41 is a ADC outputting 10 bits, input voltage range of converter 41 is between 2V~0V, and output terminals DB9~DB0 of converter 41 provides the transformed digital values, wherein output terminal DB9 provides most significant bit (MSB) and output terminal DB0 provides least significant bit (LSB).

If output terminal 211 of the Video player 21 is coupled to input terminal 211 of the display device 22 through connection group 231, the peak voltage of point P6 is changed from 2V to 1V approximately and the peak voltages of point P1~P5 are maintained at 2V.

Processor 42 sequentially turns on switches SW1~SW6 for providing the peak voltages of points P1~P6 to converter 41. Converter 41 transforms the received peak voltages and outputs the transformed peak voltages to processor 42. Since the peak voltages of P1~P6 are analog signals, switches SW1~SW6 are turned on during a preset period to detect the peak voltages of points P1~P6. The preset period is about 1 ms.

Since the peak voltages of points P1~P5 are approximately 2V, digital values of output terminals DB9~DB0 of converter 41 are 1111111111. When the peak voltage of point P6 is received by converter 41, digital values of output terminals DB9~DB0 of converter 41 are 0111110100.

Processor 42 determines whether output terminal 211 is coupled to input terminal 221 through connection group 231 according to the digital values of output terminals DB9~DB0 of converter 41.

If processor 42 determines that output terminal 211 is coupled to input terminal 221 through connection group 231 and output terminal 213 is coupled to input terminal 223 through connection group 233 respectively, a video signal is output form output terminal 211 or output terminal 213 to display device 22 for displaying a selection image corresponding to the video signal. A user selects one of the output terminals 211 and 213 as a main output terminal. Besides, the processor 42 also can determine one of the output terminals 211 and 213 as the main output terminal automatically.

FIGS. 5a~5f show the determining results of the processor. As shown in FIG. 5a, when processor 42 determines that output terminals 211~213 are coupled to input terminals 221~223 through connection groups 231~233, respectively, one of the output terminals 211~213 is a main output terminal defined by processor 42 or a user. When the main output terminal is defined by a user, processor 42 outputs a video signal to display device 22 for displaying a selection image. The user selects one of the output terminals 211~213 as the main output terminal according to the selection image. Additionally, video player 21 can comprise a vacuum fluorescent display (VFD) for selecting the main output terminal.

As shown in FIG. 5b, when processor 42 determines that output terminals 211 and 212 are coupled to input terminals 221 and 222, respectively, one of the output terminals 211 and 212 is a main output terminal defined by processor 42 or a user. When the main output terminal is defined by a user, processor 42 outputs a video signal to display device 22 for displaying a selection image. The user selects one of the output terminals 211 and 212 according to the selection image. Since FIGS. 5b~5f have the same principle, descriptions of FIGS. 5c~5f are omitted.

The invention auto-detects whether a video player is coupled to a display device through a connection group. When one output terminal of the video player is coupled to one input terminal of the display device, a video signal is output from the output terminal. When at least two output terminals of the video player are coupled to the display device, the video signal is output from a main output terminal defined by a processor or a user.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video player transmitting a first video signal to a display device through a first connection group, comprising:
    at least one first output terminal for outputting the first video signal;
    at least one second output terminal for outputting the first video signal;
    a first resistor coupled between the first output terminal and a first voltage;
    a second resistor coupled between the second output terminal and the first voltage, wherein an equivalent resistor of the display device and the first resistor are connected to act as a first voltage divider comprising a first point and the equivalent resistor of the display device and the second resistor are connected to act as a second voltage divider comprising a second point; and
    a controller determining whether the first output terminal is coupled to the display device through the first connection group and determining whether the second output terminal is coupled to the display device through the first connection group, wherein the controller only provides the first video signal to the first output terminal when the first output terminal is coupled to the display device through the first connection group and the controller only provides the first video signal to the second output terminal when the second output terminal is coupled to the display device through the first connection group;
    wherein the controller further comprises determining whether the first output terminal is coupled to the display device through the first connection group according to voltage of the first point and whether the second output terminal is coupled to the display device through the first connection group according to voltage of the second point.

2. The video player as claimed in claim 1, wherein the controller provides the first video signal to the first output terminal and provides a second video signal to the second output terminal when the first output terminal is coupled to the display device through the first connection group and the second output terminal is coupled to the display device through a second connection group.

3. The video player as claimed in claim 1, wherein the controller only provides the first video signal to the first output terminal when the first output terminal is coupled to the display device through the first connection group and the second output terminal is coupled to the display device through a second connection group.

4. The video player as claimed in claim 1, wherein the first and the second output terminals are selected from two out of a composite video terminal, a S-video terminal, and a component video terminal.

5. The video player as claimed in claim 1, wherein the controller comprises:
    a first converter transforming the voltage of the first point;
    a second converter transforming the voltage of the second point; and
    a processor determining whether the first output terminal is coupled to the display device through the first connection group according to the transformed voltage of the first point and determining whether the second output terminal is coupled to the display device through the first connection group according to the transformed voltage of the second point.

6. The video player as claimed in claim 5, wherein the first converter and the second converter are analog-digital converters.

7. The video player as claimed in claim 1, wherein the controller comprises:
    a first switch coupled to the first point;
    a second switch coupled to the second point;
    a converter, wherein the converter transforms the voltage of the first point through the first switch as the first switch is turned on and transforms the voltage of the second point through the second switch as the second switch is turned on; and
    a processor sequentially turning on the first and the second switches, wherein the processor determines whether the first output terminal is coupled to the display device through the first connection group according to the transformed voltage of the first point and determines whether the second output terminal is coupled to the display device through the first connection group according to the transformed voltage of the second point.

8. The video player as claimed in claim 7, wherein the converter is an analog-digital converter.

9. An electronic system comprising:
    a display device for displaying an image;
    a first connection group;
    a first resistor coupled between the first output terminal and a first voltage;
    a second resistor coupled between the second output terminal and the first voltage, wherein an equivalent resistor of the display device and the first resistor are connected to act as a first voltage divider comprising a first point and the equivalent resistor of the display device and the second resistor are connected to act as a second voltage divider comprising a second point; and
    a video player transmitting a first video signal to the display device through the first connection group, comprising:
        at least one first output terminal for outputting the first video signal;
        at least one second output terminal for outputting the first video signal; and
        a controller determining whether the first output terminal is coupled to the display device through the first connection group and determining whether the second output terminal is coupled to the display device through the first connection group, wherein the controller only provides the first video signal to the first output terminal when the first output terminal is coupled to the display device through the first connection group and the controller only provides the first video signal to the second output terminal when the second output terminal is coupled to the display device through the first connection group;
    wherein the controller further comprises determining whether the first output terminal is coupled to the display device through the first connection group according to voltage of the first point and whether the second output terminal is coupled to the display device through the first connection group according to voltage of the second point.

10. The electronic system as claimed in claim 9, further comprising a second connection group, wherein the controller provides the first video signal to the first output terminal and provides a second video signal to the second output terminal when the first output terminal is coupled to the display device through the first connection group and the second output terminal is coupled to the display device through the second connection group.

11. The electronic system as claimed in claim 9, further comprising a second connection group, wherein the controller only provides the first video signal to the first output terminal when the first output terminal is coupled to the display device through the first connection group and the second output terminal is coupled to the display device through the second connection group.

12. The electronic system as claimed in claim 9, wherein the first and the second output terminals are selected from two out of a composite video terminal, a S-video terminal, and a component video terminal.

13. The electronic system as claimed in claim 9, wherein the controller comprises:
a first converter transforming the voltage of the first point;
a second converter transforming the voltage of the second point; and
a processor determining whether the first output terminal is coupled to the display device through the first connection group according to the transformed voltage of the first point and determining whether the second output terminal is coupled to the display device through the first connection group according to the transformed voltage of the second point.

14. The electronic system as claimed in claim 13, wherein the first converter and the second converter are analog-digital converters.

15. The electronic system as claimed in claim 9, wherein the controller comprises:
a first switch coupled to the first point;
a second switch coupled to the second point;
a converter, wherein the converter transforms the voltage of the first point through the first switch as the first switch is turned on and transforms the voltage of the second point through the second switch as the second switch is turned on; and
a processor sequentially turning on the first and the second switches, wherein the processor determines whether the first output terminal is coupled to the display device through the first connection group according to the transformed voltage of the first point and determines whether the second output terminal is coupled to the display device through the first connection group according to the transformed voltage of the second point.

16. The electronic system as claimed in claim 15, wherein the converter is an analog-digital converter.

* * * * *